(12) United States Patent
Nochi et al.

(10) Patent No.: US 9,446,353 B2
(45) Date of Patent: Sep. 20, 2016

(54) CATALYST FOR TREATING EXHAUST GAS AND METHOD FOR PRODUCING THE SAME

(75) Inventors: Katsumi Nochi, Hiroshima-ken (JP); Masanao Yonemura, Hiroshima-ken (JP); Yoshiaki Obayashi, Hiroshima-ken (JP); Hitoshi Nakamura, Nagasaki-ken (JP); Toshio Koyanagi, Nagasaki-ken (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1137 days.

(21) Appl. No.: 11/705,045

(22) Filed: Feb. 12, 2007

(65) Prior Publication Data

US 2007/0207078 A1 Sep. 6, 2007

(30) Foreign Application Priority Data

Feb. 16, 2006 (JP) .................. 2006-039356

(51) Int. Cl.
| | |
|---|---|
| *B01D 53/56* | (2006.01) |
| *B01D 53/94* | (2006.01) |
| *B01J 23/652* | (2006.01) |
| *B01J 35/04* | (2006.01) |
| *B01J 37/02* | (2006.01) |

(52) U.S. Cl.
CPC .......... *B01D 53/945* (2013.01); *B01J 23/6527* (2013.01); *B01J 35/04* (2013.01); *B01J 37/0248* (2013.01); *B01D 2255/20723* (2013.01); *B01D 2255/20776* (2013.01); *B01D 2257/708* (2013.01); *Y02C 20/10* (2013.01); *Y02T 10/22* (2013.01)

(58) Field of Classification Search
CPC B01J 23/6482; B01J 23/6527; B01J 23/063; B01J 23/38; B01J 23/40; B01J 23/42; B01J 23/46; B01J 23/30; B01J 23/6525; B01J 23/54; B01J 23/00; B01J 23/002; B01J 23/007; B01J 35/04; B01J 35/023; B01J 35/08; B01D 53/945; B01D 53/86; B01D 53/56; B01D 2255/20723; B01D 2255/20776; B01D 2257/708; Y02T 10/22; Y02C 20/10
See application file for complete search history.

(56) References Cited

U.S. PATENT DOCUMENTS

| | | | |
|---|---|---|---|
| 5,232,646 A | 8/1993 | Nasvik et al. | |
| 5,232,889 A | 8/1993 | Blanchard et al. | |
| 5,352,646 A | 10/1994 | Blanchard et al. | |
| 5,869,419 A * | 2/1999 | Obayashi et al. | 502/305 |

FOREIGN PATENT DOCUMENTS

| | | | | |
|---|---|---|---|---|
| JP | 03-221147 A | | 9/1991 | |
| JP | 2651998 B2 | | 10/1997 | |
| JP | 10-309462 | * | 11/1998 | ............. B01J 23/42 |
| JP | 10-309462 A | | 11/1998 | |
| JP | 2001-149758 A | | 6/2001 | |
| JP | 2001-224968 | * | 8/2001 | ............. B01J 37/02 |
| JP | 2003-175317 A | | 6/2003 | |
| JP | 2005-081183 | * | 3/2005 | ............. B01J 37/02 |
| JP | 2006-297188 | * | 2/2006 | ............. B01J 35/10 |

OTHER PUBLICATIONS

JP2003-175317 machine translation, Atsushi et al.*
Japanese Office Action dated Dec. 24, 2010, issued in corresponding Japanese Patent Application No. 2006-039356.

* cited by examiner

*Primary Examiner* — Melvin C Mayes
*Assistant Examiner* — Smita Patel
(74) *Attorney, Agent, or Firm* — Westerman, Hattori, Daniels & Adrian, LLP

(57) ABSTRACT

An object of the present invention is to provide a catalyst for treating exhaust gas adapted not only to remove CO and VOCs based on unsaturated hydrocarbons such as $C_2H_4$ but also to accelerate a decomposition reaction of saturated hydrocarbons such as propane and to provide a method for producing such a catalyst for treating exhaust gas. The present invention provides a catalyst for treating an exhaust gas containing carbon monoxide and volatile organic compounds, the catalyst comprising a substrate containing a NOx removal catalyst component and a porous inorganic compound layer containing a noble metal, the layer being applied to the substrate.

1 Claim, No Drawings

CATALYST FOR TREATING EXHAUST GAS AND METHOD FOR PRODUCING THE SAME

BACKGROUND OF THE INVENTION

1. Field of the Invention

The present invention generally relates to a catalyst for treating exhaust gas and a method for producing the same, and more particularly to a catalyst for treating an exhaust gas containing carbon monoxide and volatile organic compounds and a method for producing the catalyst for treating the exhaust gas.

2. Description of the Related Art

Exhaust gases discharged from various industrial equipment such as automobile engines, gas engines, gas turbines for aircraft and for power generation, and equipment in chemical plants and in various factories contain $NO_x$, $SO_x$, CO (carbon monoxide), unburned volatile organic compounds (VOCs), and the like. Catalysts for treating exhaust gas are used for treating such substances contained in exhaust gas.

For example, Japanese Patent Laid-Open No. 10-309462 discloses a NMHC oxidation catalyst in which Pt (platinum) is supported on an alumina carrier.

However, such a catalyst for treating exhaust gas in which Pt (platinum) is supported on an alumina carrier is excellent in removing CO and VOCs based on unsaturated hydrocarbons such as $C_2H_4$ but is poor in removing saturated hydrocarbons such as $C_3H_8$.

It is desired to remove not only CO and VOCs based on unsaturated hydrocarbons such as $C_2H_4$ but also to improve the removal of saturated hydrocarbons such as $C_3H_8$ (propane). For example, an exhaust gas from gas turbines may contain about 5 ppm of unsaturated hydrocarbons such as $C_2H_4$ and about 2 ppm of saturated hydrocarbons such as $C_3H_8$. VOC emission control is not established yet in Japan but already established in some foreign countries. For example, according to U.S. VOC emission control, the emission of VOCs is restricted to 2 ppm or less. Even if 90% of unsaturated hydrocarbons can be reduced, a saturated hydrocarbon-emission concentration needs to be reduced by at least 25%, from 2 ppm to 1.5 ppm. Similarly, the emission of CO (carbon monoxide) is also restricted. For example, it is restricted to 2 ppm or less in United States. Since the emission concentration of CO discharged from a gas turbine may exceed 60 ppm, 97% or more of the exhaust gas needs to be reduced.

The present invention has been made in view of the above circumstances, and an object of the present invention is to provide a catalyst for treating exhaust gas adapted not only to remove CO and VOCs based on unsaturated hydrocarbons such as $C_2H_4$ but also to accelerate the decomposition reaction of saturated hydrocarbons such as propane and to provide a method for producing such a catalyst for treating exhaust gas.

SUMMARY OF THE INVENTION

The present invention provides a catalyst for treating an exhaust gas containing carbon monoxide and volatile organic compounds, the catalyst comprising a substrate containing a fresh NOx removal catalyst component which has not been used for the removal of NOx from exhaust gas and a porous inorganic compound layer containing a noble metal, the layer being applied to the substrate.

In another embodiment, the present invention provides a catalyst for treating an exhaust gas containing carbon monoxide and volatile organic compounds, the catalyst comprising a substrate containing a fresh NOx removal catalyst component which has not been used for the removal of NOx from exhaust gas and a porous inorganic compound layer containing a noble metal and a fresh NOx removal catalyst, the layer being applied to the substrate.

The present inventors have found that, in the process for developing a technology for reductively removing nitrogen oxides with ammonia using a NOx removal catalyst, the catalyst also has the capability to partially oxidize a VOC containing unsaturated hydrocarbons such as $C_2H_4$ and $C_6H_6$ and saturated hydrocarbons such as $C_3H_8$ and $C_4H_{10}$ to CO. Since nitrogen oxides are inevitably contained in exhaust gases from automobile engines, gas turbines for power generation, chemical plants, and the like, and NOx emission control is strict at present, it is not uncommon that a NOx removal catalyst for reductively removing nitrogen oxides with ammonia is installed in these facilities. Therefore, it is very efficient also in terms of cost to remove VOCs containing hardly-combustible saturated hydrocarbons by utilizing a NOx removal catalyst generally used in the industry for the purpose of removing VOCs.

The above-described porous inorganic compound layer may be applied in a thickness of 4 to 30 μm. Further, in an embodiment of the present invention, the substrate containing a NOx removal catalyst component contains 60 to 90 mass parts of $TiO_2$, 0 to 8 mass parts of $V_2O_5$, and 3 to 20 mass parts of $WO_3$. Furthermore, the noble metal may have a particle size of 1 to 15 nm.

In another aspect, the present invention provides a method for producing a catalyst for treating exhaust gas, the method comprising the steps of: reducing an aqueous metal salt solution in which one or more metal salts are dissolved to prepare a metal colloidal solution; loading the metal colloidal solution on an active porous inorganic compound to form a slurry; and applying the slurry to a substrate containing a NOx removal catalyst.

In another embodiment, the method for producing a catalyst for treating exhaust gas comprises the steps of: reducing an aqueous metal salt solution in which one or more metal salts are dissolved to prepare a metal colloidal solution; loading the metal colloidal solution on an active porous inorganic compound to form a first slurry; mixing the first slurry with a second slurry containing a NOx removal catalyst; and applying the mixture to a substrate containing a NOx removal catalyst.

The present invention provides a catalyst for treating exhaust gas adapted not only to remove CO and VOCs based on unsaturated hydrocarbons such as $C_2H_4$ but also to accelerate the decomposition reaction of saturated hydrocarbons such as propane and provides a method for producing such a catalyst for treating exhaust gas.

DETAILED DESCRIPTION OF THE PREFERRED EMBODIMENTS

The catalyst for treating exhaust gas of the present invention will now be described further in detail below.

First, the catalyst for treating exhaust gas of the present invention can suitably be used for treating exhaust gases containing CO and volatile organic compounds (VOCs). Specifically, the catalyst for treating exhaust gas of the present invention is applicable to exhaust gases discharged from so called lean-burn gas engines, gas turbines, and the like. It should be noted that the definition of volatile organic compounds generally excludes methane and ethane.

The catalyst for treating exhaust gas of the present invention comprises a substrate such as a honeycomb substrate containing a NOx removal catalyst component and a porous inorganic compound layer containing a noble metal, the layer being applied to the substrate.

That is, the catalyst for treating exhaust gas of the present invention has a coating layer of a carrier composed of a porous inorganic compound.

The porous inorganic compound, that is, the compound composing a carrier, preferably includes at least one selected from the group consisting of $SiO_2$, $Al_2O_3$, $TiO_2$, $ZrO_2$, $SiO_2$—$Al_2O_3$, $TiO_2$—$SiO_2$, $TiO_2$—$Al_2O_3$, $TiO_2$—$ZrO_2$, $SO_4/TiO_2$—$ZrO_2$, metalosilicates, and zeolites such as β-zeolite.

Such a porous inorganic compound preferably has a BET specific surface area of 50 $m^2/g$ or more in order to support a metal colloid containing a noble metal, which will be described below, in a highly dispersed state.

The noble metal to be supported as a catalytically active component preferably includes at least one or more selected from the group consisting of Ir, Rh, Ru, Pt, Pd, Ag, Au, and oxides thereof. The noble metal is used mainly for accelerating the capability to remove CO and VOCs.

The NOx removal catalyst component contained in the substrate includes an oxide of at least one or more selected from the group consisting of vanadium and tungsten or a complex oxide thereof, preferably $V_2O_5$ and $WO_3$, supported on a carrier.

The carrier includes at least one selected from the group consisting of $SiO_2$, $Al_2O_3$, $TiO_2$, $ZrO_2$, $SiO_2$—$Al_2O_3$, $TiO_2$—$SiO_2$, $TiO_2$—$Al_2O_3$, $TiO_2$—$ZrO_2$, $SO_4/ZrO_2$, $SO_4/TiO_2$, and $SO_4/TiO_2$—$ZrO_2$.

Next, a preferred embodiment of the method for producing the catalyst for treating exhaust gas of the present invention will be described below.

In the method for producing the catalyst for treating exhaust gas of the present invention, there is produced an aqueous metal salt solution in which at least one metal salt is dissolved. Then, the aqueous metal salt solution is reduced to prepare a metal colloidal solution. Then, the metal colloid solution is loaded on an active porous inorganic compound to form a slurry, which is then applied to a honeycomb substrate containing a NOx removal catalyst.

The above metal salt is preferably a metal salt of a noble metal by which catalytic activity is achieved. A plural types of noble metal salts can also be used. Preferred noble metal salts include nitrates, chlorides, acetates, and complex salts of Ir, Rh, Ru, Pt, Pd, Ag, and Au. Among others, nitrates, chlorides, acetates, and complex salts of Pt, Pd, and Ru are more preferred. It should be noted that a noble metal having catalytic activity may be loaded on an active porous inorganic compound without reducing its metal salt to form a slurry, which is then applied to a honeycomb substrate containing a NOx removal catalyst component.

The aqueous metal salt solution in which at least one metal salt is dissolved is added to a preferred mixture selected from mixtures of water, a reducing agent, and a polymer material as described below.

The mixture of water, a reducing agent, and a polymer material is basically prepared by dissolving a polymer material in water followed by charging a reducing agent for reduction treatment to follow. Alternatively, a mixed solution of a reducing agent and a polymer material may be charged into an aqueous solution containing no polymer material.

Water, which is used in both of the above procedures, is preferably used after removing dissolved oxygen by boiling. Alternatively, after a polymer material and a reducing agent are mixed in water, the water may be boiled to remove dissolved oxygen.

Compounds which can be used as a reducing agent preferably include organic compounds. Examples of the preferred compounds include carboxylic acids and their salts such as sodium citrate, potassium citrate, acetic acid, formic acid, and malic acid; alcohols such as methanol, ethanol, and propanol; ethers such as diethyl ether; and ketones such as methyl ethyl ketone.

Examples of the compounds which can be used as polymer materials include water-soluble polymers such as polyvinyl alcohol, polyvinyl pyrrolidone, and polymethylvinylether.

In the method for producing the catalyst for treating exhaust gas of the present invention, the aqueous metal salt solution obtained as described above is reduced to prepare a metal colloidal solution. Typically, reduction of a metal salt proceeds by heating the aqueous metal salt solution to about 80 to 95° C.

In the reduction reaction, dissolved metal ions are reduced to form metal colloid particles. At the completion of the reaction, a metal colloidal solution is prepared. The metal colloids can be present in a stable state without being precipitated by coagulation because the polymer material coats the metal colloids.

In the method for producing the catalyst for treating exhaust gas of the present invention, the aqueous metal salt solution may contain a pH buffer, which keeps pH at a constant level even if the solution evaporates during the production of colloids. This stabilizes the reduction rate of metal ions and allows very fine colloid particles to be prepared. Further, since the pH buffer action is inherited to the metal colloidal solution also in the loading step, it is possible to maintain pH constant regardless of the immersion process of the active metal and to load the metal on a carrier in a highly dispersed state.

Alternatively, a pH buffer may be newly added in the loading step when it is not added in the step for producing colloids.

The noble metal colloids to be produced have a particle size of generally 1 to 15 nm, preferably 2 to 1 nm, and more preferably 2 to 3 nm. The particle size of the noble metal colloids can be controlled by the amount of a polymer material to be added for coating the noble metal colloids. The noble metal colloids coated with the polymer material are loaded on an active porous inorganic compound in a later step. The noble metal colloids preferably have a particle size of about 1 to 15 nm for facilitating adsorption thereof to the porous inorganic compound.

Further, in order to ensure both stability and adsorption rate to the porous inorganic compound and to increase the surface area of the noble metal, the noble metal colloids preferably have a particle size of 2 to 11 nm.

The noble metal colloids more preferably have a particle size of 2 to 3 nm, because, although adsorption rate to the porous inorganic compound decreases to some extent when the polymer material is added in a large amount, the colloids can be present stably without being precipitated by coagulation, and the noble metal has a large surface area, which can be maintained even after firing.

The metal colloid solution is loaded on an active porous inorganic compound by spray drying, and the porous inorganic compound with the metal colloidal solution thereon is fired, for example, at 500° C. for 5 hours and then subjected to ball milling to form a slurry. A substrate containing a NOx removal catalyst component is immersed in the slurry to wash-coat a predetermined amount of catalyst. Then, the catalyst is fired again at 500° C. for 5 hours.

At the wash-coating, the amount of coating is generally from 8.5 to 16.1 m²/g so that the coating layer has a thickness in the range of 20±16 μm, preferably from 9.5 to 16.1 m²/g so that the coating layer has a thickness in the range of 20±10 μm, and more preferably from 9.5 to 14 m²/g so that the coating layer has a thickness in the range of 15±5 μm.

When the coating layer is allowed to have a wide range of thickness from 4 to 30 μm, the coating can be performed without accurately controlling the slurry concentration and slurry temperature. Further, when a porous inorganic compound containing a NOx removal catalyst component is used as a substrate, an adequate coating thickness of an active porous inorganic layer is required in order to prevent elution of the NOx removal catalyst when the substrate is immersed in the slurry, because noble metals are largely supported in the region from the surface of the coating layer to about 20 μm in depth.

Moreover, controlling the slurry concentration and slurry temperature reduces the pressure loss by reducing the thickness variation of the coating layer. In order to suppress the reduction in performance due to the separation of the coating layer and the adsorption of impurities in exhaust gases, the thickness of the coating layer is preferably from 10 to 30 μm.

However, in order to further reduce the pressure loss due to a large amount of exhaust gas flowing through the honeycomb, the thickness of the coating layer is preferably from 10 to 20 μm. In this case, when the substrate containing a NOx removal catalyst component is immersed in a noble metal colloidal solution, the NOx removal catalyst component may elute as described above. Therefore, the noble metal colloidal solution is previously loaded on the porous inorganic compound to form a slurry. Then, the honeycomb substrate containing the NOx removal catalyst component is wash-coated with the slurry. This procedure makes it possible to produce a catalyst for treating exhaust gas having a low pressure loss and high activity. At this time, it is required to appropriately control the slurry concentration and slurry temperature.

Moreover, in order to prevent dramatic reduction in catalytic activity due to adsorption of impurities and catalyst-poisoning substances in exhaust gases, conventional catalysts were applied to cordierite honeycomb substrates in a minimum amount of about 50 g/m² (a coating layer thickness of about 20 to 80 μm). The thickness of the coating layer is an important factor in attempting to increase the catalyst life because catalyst-poisoning substances adsorb not only to catalytically active components such as noble metals but also to active porous inorganic compounds to be used as a carrier. A cordierite substrate has a specific surface area of less than 1 m²/g. Since it has a very small adsorption area, it has clearly different properties from those of the active porous inorganic compound used as a carrier.

However, in the present invention, the role played by the active porous inorganic compound as a carrier in adsorbing catalyst-poisoning substances can also be played by a honeycomb substrate containing a NOx removal catalyst component. The specific surface area of a honeycomb type NOx removal catalyst is several ten times as large as that of a cordierite substrate. This catalyst is also excellent in the diffusion of gases since it is an extruded catalyst which is typically used as a NOx removal catalyst. Consequently, the gas containing a catalyst-poisoning substance diffuses not only into a coating layer containing a porous inorganic compound at the honeycomb surface layer but into a honeycomb substrate, thereby improving a catalyst life. Therefore, in order to make the most of the characteristics of using a honeycomb type NOx removal catalyst as a substrate, the coating layer of a porous inorganic compound to be applied to the surface layer is preferably thin as small as 4 to 30 μm instead of applying a thick layer as large as 20 to 80 μm as used in conventional methods.

Moreover, the noble metal supported on the coating layer is sufficiently utilized including a portion thereof present in the depths of the layer by decreasing the thickness thereof. When the coating layer has a thickness as large as 20 to 80 μm, as used in a conventional method, a noble metal present in the depths of the coating layer is not sufficiently utilized, because gases do not diffuse rapidly. Comparative Example 3 to be described below is an example of this case. In Comparative Example 3, since a noble metal is present down to the depths of a coating layer, the activity of the noble metal is not sufficiently exerted. Therefore, as in Comparative Example 2 to be described below, it has been necessary to use a method comprising wash-coating an active porous inorganic compound on a substrate, then immersing the substrate in an aqueous noble metal solution, and loading the noble metal in the surface layer of the coating layer.

Further, it is possible to cut cost by reducing the number of wash-coatings by having a thin coating layer. Furthermore, the thin coating layer leads to the reduction of the amount of the porous inorganic compound as a carrier, which also allows cost reduction.

In the catalyst for treating exhaust gas of the present invention, a substrate is wash-coated with a porous inorganic compound layer as a single layer, because a load on production can be greatly reduced by providing a single layer. As described herein "single layer" refers to a coating layer prepared by wash-coating one type of slurry in several divided times. The single layer is different from a coating layer prepared by wash-coating two types of slurry having different composition.

It should be noted that, in the method for producing the catalyst for treating exhaust gas according to the present invention, a plurality of active metals can be supported on the resulting catalyst. That is, the active metal can include one or more than one noble metal. In addition, the amount of the noble metals to be supported may be 0.7 g/L or less per one type for obtaining sufficient effect.

Alternatively, the above-described porous inorganic compound layer may be a porous inorganic compound layer containing both a noble metal and a NOx removal catalyst component.

In this case, the catalyst formed in a honeycomb shape may be milled and mixed with an active porous inorganic compound containing a noble metal to form a slurry, or a slurry of the NOx removal catalyst is mixed with a slurry of the active porous inorganic compound containing a noble metal. Then, the slurry can be coated to a substrate to form a porous inorganic compound layer.

Specifically, a substrate containing a NOx removal catalyst component can be prepared, for example, by adding ammonia water to a metatitanic acid slurry, adding a predetermined amount of an ammonium paratungstate powder to the resulting mixture, and then kneading, drying, and firing the resulting mixture to obtain a catalyst powder. This powder and if necessary a molding auxiliary are charged into a kneader, kneaded by adding an appropriate amount of water, extruded, dried and then fired. The substrate prepared in this manner preferably has a pore volume of 0.25 to 0.40 g/cc, because this improves diffusion of exhaust gases into the catalyst to facilitate partial oxidation reaction to be described below.

The following reactions proceed in the catalyst for treating exhaust gas according to the present invention.

$$CO + O_2 \rightarrow CO_2 \qquad \text{(Equation I)}$$
$$C_nH_{2n} + O_2 \rightarrow CO_2 + H_2O \qquad \text{(Equation II)}$$

| | |
|---|---|
| $C_nH_{2n+m} + O_2 \rightarrow CO_2 + H_2O$ | (Equation III) |
| $C_nH_{2n} + O_2 \rightarrow CO + H_2O$ | (Equation IV) |
| $C_nH_{2n+m} + O_2 \rightarrow CO + H_2O$ | (Equation V) |

Equation I represents oxidation reaction of CO; Equation II represents oxidation reaction of unsaturated hydrocarbons; Equation III represents oxidation reaction of saturated hydrocarbons; Equation IV represents partial oxidation reaction of unsaturated hydrocarbons; and Equation V represents partial oxidation reaction of saturated hydrocarbons. Coefficients of the reaction equations are omitted.

The oxidation reactions represented by Equations I and II proceed on a noble metal supported on a porous inorganic compound. The reactions according to Equations I and II proceed rapidly on the noble metal. However, the reaction according to Equation III has a slower reaction rate than the reactions according to Equations I and II. Therefore, when an exhaust gas containing volatile organic compounds is treated, a problem to be solved is to increase the rate of the reaction according to Equation III.

The partial oxidation reactions represented by Equations IV and V proceed on a NOx removal catalyst such as a $TiO_2$—$V_2O_5$—$WO_3$-based catalyst. Thus, the reactions according to Equations IV and V are facilitated on the catalyst according to the present invention, thereby producing CO. As described above, CO is rapidly oxidized on a noble metal. Therefore, according to the present invention, the oxidative removal of saturated hydrocarbons having a slow reaction rate can be accelerated through partial oxidation reaction.

EXAMPLES

Example 1

A $TiO_2$—$V_2O_5$—$WO_3$-based NOx removal catalyst ($TiO_2$:$V_2O_5$:$WO_3$=80:3:8 (mass ratio)) was prepared as follows.

To 3,600 g of a metatitanic acid slurry (containing 30% by mass of $TiO_2$), was added ammonia water containing 25% of $NH_3$ followed by controlling pH to 6.5. To the resulting slurry, was added an ammonium paratungstate powder in an amount such that the resulting mixture contained 8% by mass of $WO_3$. The resulting mixture was wet-kneaded for 2 hours, dried, and fired at 550° C. for 5 hours, obtaining a powder comprising titanium oxide and tungsten oxide. To the resulting powder, was added an aqueous ammonium metavanadate solution in an amount such that the resulting mixture contained 3% by mass of $V_2O_5$. The resulting mixture was sufficiently mixed, dried, and fired at 450° C. for 4 hours, obtaining a powder (A) comprising titanium oxide [$TiO_2$], vanadium oxide [$V_2O_5$], and tungsten oxide [$WO_3$]. Into a kneader, were charged 1,000 g of the powder (A), 25 g of carboxymethylcellulose, 12.5 g of polyethylene oxide, and an appropriate amount of water. The resulting mixture was kneaded for 30 minutes, extruded to a size of 50 mm², dried, and fired at 500° C. for 5 hours.

Example 2

The same catalyst as described in Example 1 was used.

Example 3

Preparation of Pt Colloidal Solution

To 1.5 liter of ion-exchanged water, were added 1.5 liter of ethanol and 32 g of polyvinyl alcohol (having an average polymerization degree of 900 to 1,100) to prepare 3 liters of a mixed solution. The mixed solution was boiled for 1 hour to remove dissolved oxygen. To the resulting mixed solution, was added 0.1 liter of dinitrodiammine Pt to prepare an aqueous noble metal-containing solution (75 mmol of Pt). This aqueous solution was subjected to reduction treatment by maintaining it at about 90° C. for 5 hours. After observing a color change of the solution to black, the solution was cooled with ice to prepare a Pt colloidal solution. At this time, pH of the solution was 1.

Preparation of Pt-Loaded Slurry:

The resulting noble metal-containing colloidal solution in an amount of 8,800 g was loaded by spray drying on 1,500 g of γ-$Al_2O_3$, an active porous inorganic compound, having a BET specific surface area of 113 m²/g, fired at 500° C. for 5 hours, and subjected to ball milling at 100 rpm for 8 hours to obtain a slurry.

Loading of Pt Slurry on Substrate:

To 3,600 g of a metatitanic acid slurry (containing 30% by mass of $TiO_2$), was added ammonia water containing 25% of $NH_3$ followed by controlling pH to 6.5. To the resulting slurry, was added an ammonium paratungstate powder in an amount such that the resulting mixture contained 8% by mass of $WO_3$. The resulting mixture was wet-kneaded for 2 hours, dried, and fired at 550° C. for 5 hours, obtaining a powder comprising titanium oxide and tungsten oxide. To the resulting powder, was added an aqueous ammonium metavanadate solution in an amount such that the resulting mixture contained 3% by mass of $V_2O_5$. The resulting mixture was sufficiently mixed, dried, and fired at 450° C. for 4 hours, obtaining a powder (A) comprising titanium oxide [$TiO_2$], vanadium oxide [$V_2O_5$], and tungsten oxide [$WO_3$]. Into a kneader, were charged 1,000 g of the powder (A), 25 g of carboxymethylcellulose, 12.5 g of polyethylene oxide, and an appropriate amount of water. The resulting mixture was kneaded for 30 minutes, extruded to a size of 50 mm², dried, and fired at 500° C. for 5 hours. A substrate containing a NOx removal catalyst component (50 mm in length×50 mm in width×50 mm in height) was prepared according to the procedure as described above. The substrate had a pore volume of 0.35 cc/g. The pore volume was determined by a method of mercury penetration. It should be noted that the substrate containing a NOx removal catalyst component used in Example 3 is the same one as the $TiO_2$—$V_2O_5$—$WO_3$-based catalyst used in Examples 1 and 2.

The honeycomb substrate was immersed in the Pt-loaded slurry obtained as described above and coated with the slurry such that Pt/γ-$Al_2O_3$ was applied in an amount of 8.5 to 11.5 g/m² (a coating layer thickness of 4 to 20 μm) based on the surface area of the honeycomb. The catalyst coated with Pt/γ-$Al_2O_3$ was dried at 110° C. and fired at 500° C. for 5 hours. The resulting catalyst was named as the catalyst from Example 3. It should be noted that the coating layer thickness of the catalyst is in the range of 4 to 20 μm due to the variations in the coating of the slurry.

Example 4

Preparation of a Pt colloidal solution and preparation of a Pt-loaded slurry were performed in the same manner as in Example 3.

To 3,600 g of a metatitanic acid slurry (containing 30% by mass of $TiO_2$), was added ammonia water containing 25% of $NH_3$ followed by controlling pH to 6.5. To the resulting slurry, was added an ammonium paratungstate powder in an amount such that the resulting mixture contained 20% by mass of $WO_3$. The resulting mixture was wet-kneaded for 2 hours, dried, and fired at 550° C. for 5 hours, obtaining a powder (B) comprising titanium oxide [$TiO_2$] and tungsten oxide [$WO_3$]. Into a kneader, were charged 1,000 g of the powder (B), 25 g of carboxymethylcellulose, 12.5 g of polyethylene oxide, and an appropriate amount of water. The resulting mixture was kneaded for 30 minutes, extruded to a size of 50 mm², dried, and fired at 500° C. for 5 hours. A substrate containing a NOx removal catalyst component (50 mm in length×50 mm in width×50 mm in height) was prepared according to the procedure as described above. The substrate had a pore volume of 0.35 cc/g. The pore volume was determined by a method of mercury penetration.

The honeycomb substrate comprising titanium oxide [$TiO_2$] and tungsten oxide [$WO_3$] was immersed in the Pt slurry obtained in the same manner as in Example 3 and coated with the slurry such that Pt/γ-$Al_2O_3$ was applied in an amount of 8.5 to 11.5 g/m² (a coating layer thickness of 4 to 20 μm) based on the surface area of the honeycomb. The catalyst coated with Pt/γ-$Al_2O_3$ was dried at 110° C. and fired at 500° C. for 5 hours. The resulting catalyst was named as the catalyst from Example 4. It should be noted that the coating layer thickness of the catalyst is in the range of 4 to 20 μm due to the variations in the coating of the slurry.

Example 5

Preparation of a Pt colloidal solution was performed in the same manner as in Example 3.

The Pt-containing colloidal solution in an amount of 8,800 g was loaded by spray drying on 1,500 g of γ-$Al_2O_3$, an active porous inorganic compound, having a BET specific surface area of 113 m²/g, fired at 500° C. for 5 hours, and subjected to ball milling at 100 rpm for 8 hours to obtain a slurry. A honeycomb type NOx removal catalyst comprising titanium oxide [$TiO_2$], vanadium oxide [$V_2O_5$], and tungsten oxide [$WO_3$] was crushed and subjected to ball milling at 100 rpm for 8 hours to obtain a slurry. The former slurry was mixed with the latter slurry in a mass ratio of 7:3 to obtain a mixed slurry. The honeycomb type NOx removal catalyst comprising titanium oxide [$TiO_2$], vanadium oxide [$V_2O_5$], and tungsten oxide [$WO_3$] as described in Example 3 was coated with the resulting mixed slurry such that the slurry was applied in an amount of 11.9 to 16.1 g/m² (a coating layer thickness of 6 to 30 μm) based on the surface area of the honeycomb. The catalyst coated with the mixed slurry was dried at 110° C. and fired at 500° C. for 5 hours. The resulting catalyst was named as the catalyst from Example 5.

It should be noted that the coating layer thickness of the catalyst is in the range of 6 to 30 μm due to the variations in the coating of the slurry.

Example 6

Preparation of a Pt colloidal solution was performed in the same manner as in Example 3.

The Pt-containing colloidal solution in an amount of 8,800 g was loaded by spray drying on 1,500 g of γ-$Al_2O_3$, an active porous inorganic compound, having a BET specific surface area of 113 m²/g, fired at 500° C. for 5 hours, and subjected to ball milling at 100 rpm for 8 hours to obtain a slurry. A honeycomb type NOx removal catalyst comprising titanium oxide [$TiO_2$] and tungsten oxide [$WO_3$] was crushed and subjected to ball milling at 100 rpm for 8 hours to obtain a slurry. The former slurry was mixed with the latter slurry in a mass ratio of 7:3 to obtain a mixed slurry. The honeycomb type NOx removal catalyst comprising titanium oxide [$TiO_2$] and tungsten oxide [$WO_3$] was coated with the resulting mixed slurry such that the slurry was applied in an amount of 11.9 to 16.1 g/m² (a coating layer thickness of 6 to 30 μm) based on the surface area of the honeycomb. The catalyst coated with the mixed slurry was dried at 110° C. and fired at 500° C. for 5 hours. The resulting catalyst was named as the catalyst from Example 6.

It should be noted that the coating layer thickness of the catalyst is in the range of 6 to 30 μm due to the variations in the coating of the slurry.

Comparative Example 1

In Comparative Example 1, a commercially available corrugated metal honeycomb catalyst manufactured by Engelhard Corporation was used as a CO/VOC removal catalyst.

Comparative Example 2

Preparation of Metal Colloidal Solution

A Pt colloidal solution was prepared in the same manner as in Example 3.

Loading Pt Colloid on Substrate:

The aqueous Pt colloidal solution prepared as described above was diluted with ion-exchanged water to prepare 4,000 cc of an aqueous solution containing 0.07% by weight of the Pt colloid based on the total weight. In the aqueous solution, was immersed a cordierite honeycomb substrate (50 mm in length×50 mm in width×50 mm in height) coated with γ-$Al_2O_3$, an active porous inorganic compound, having a BET specific surface area of 113 m²/g in an amount of 42.5 to 57.5 g/m² for 30 minutes to load a predetermined amount of Pt. At this time, polyvinyl alcohol was contained in an amount of 0.16% by weight based on the total weight of the aqueous solution, and pH was 2.6. The catalyst produced by the loading was dried at 110° C. and fired at 500° C. for 5 hours. The finished catalyst was named as the catalyst from Comparative Example 2. The catalyst was uniformly colored in black by visual observation.

Comparative Example 3

A Pt colloidal solution was prepared in the same manner as in Example 3.

The Pt-containing colloidal solution in an amount of 8,800 g was loaded by spray drying on 1,500 g of γ-$Al_2O_3$, an active porous inorganic compound, having a BET specific surface area of 113 m²/g and fired at 500° C. for 5 hours to obtain a slurry. A cordierite honeycomb was coated with the resulting slurry such that the slurry was applied in an amount of 42.5 to 57.5 g/m² (a coating layer thickness of 20 to 80 μm) based on the surface area of the honeycomb. The catalyst coated with the slurry was dried at 110° C. and fired at 500° C. for 5 hours. The resulting catalyst was named as the catalyst from Comparative Example 3.

It should be noted that the coating layer thickness of the catalyst is in the range of 20 to 80 μm due to the variations in the coating of the slurry.

An oxidation reaction test of VOCs using the NOx removal catalyst from Example 1 was performed by analyzing the concentration of hydrocarbons in exhaust gases before and immediately after passing through the NOx removal catalyst with a gas chromatograph (FID-type) manufactured by Shimadzu Corporation. The results are shown in Table 1. It was possible to partially oxidize saturated hydrocarbons by the NOx removal catalyst from Example 1 according to the present invention.

TABLE 1

| NOx removal catalyst (% by mass) | Temperature (° C.) | Concentration on entering NOx removal catalyst section (ppm) | | | | | Concentration on leaving NOx removal catalyst section (ppm) | | | | | Degree of conversion (%) | | | | |
|---|---|---|---|---|---|---|---|---|---|---|---|---|---|---|---|---|
| | | CO | $CH_4$ | $C_2H_6$ | $C_3H_8$ | $C_4H_{10}$ | CO | $CH_4$ | $C_2H_6$ | $C_3H_8$ | $C_4H_{10}$ | CO | $CH_4$ | $C_2H_6$ | $C_3H_8$ | $C_4H_{10}$ |
| Example 1  TiO2(80) V2O5(3) WO3(8) | 400 | 9400 | 8450 | 650 | 260 | 190 | 10860 | 8380 | 530 | 90 | 30 | — | 0.8 | 18.5 | 65.4 | 84.2 |
| | 350 | 9400 | 8450 | 650 | 260 | 190 | 10490 | 8450 | 570 | 150 | 40 | — | 0.0 | 12.3 | 42.3 | 78.9 |
| | 300 | 9400 | 8450 | 650 | 260 | 190 | 10160 | 8450 | 600 | 200 | 70 | — | 0.0 | 7.7 | 23.1 | 63.2 |
| | 250 | 9400 | 8450 | 650 | 260 | 190 | 9830 | 8450 | 620 | 230 | 120 | — | 0.0 | 4.6 | 11.5 | 36.8 |
| | 200 | 9400 | 8450 | 650 | 260 | 190 | 9560 | 8450 | 640 | 240 | 170 | — | 0.0 | 1.5 | 7.7 | 10.5 |

Example 1

Exhaust gas 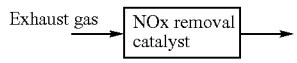

Kerosene combustion exhaust gas:
Linear flow velocity 2.0 Nm/s
CO: 9,400 ppm
$CH_4$: 8,450 ppm
$C_2H_6$: 650 ppm
$C_3H_8$: 260 ppm
$C_4H_{10}$: 190 ppm
$O_2$: 10%,
NOx, $CO_2$, $H_2O$, $N_2$: Not controlled.
Space velocity of NOx removal catalyst [GHSV]: 7,500h$^{-1}$
Operation temperature 200° C., 250° C., 300° C., 350° C., 400° C.

An oxidation reaction test of VOCs using the NOx removal catalyst from Example 2 was performed by analyzing the concentration of hydrocarbons in exhaust gases before and immediately after passing through the NOx removal catalyst with a gas chromatograph (FID-type) manufactured by Shimadzu Corporation. The results are shown in Table 2. It was possible to partially oxidize saturated hydrocarbons by the NOx removal catalyst from Example 2 according to the present invention.

A test for evaluating the degree of conversion using the CO/VOC removal catalyst from Comparative Example 1 was performed under the following initial conditions by measuring the concentration of gases before and immediately after passing through the CO/VOC removal catalyst with an analyzer (gas chromatograph (FID-type) manufactured by Shimadzu Corporation). It was found that the commercially available oxidation catalyst described in Comparative Example 1 was able to remove only 10% of saturated hydrocarbons at 400° C. The results are shown in Table 3.

TABLE 2

| NOx removal catalyst (% by mass) | Temperature (° C.) | Concentration on entering exhaust gas-treating catalyst section (ppm) | | | Concentration on leaving exhaust gas-treating catalyst section (ppm) | | | Degree pf conversion (%) | | |
|---|---|---|---|---|---|---|---|---|---|---|
| | | $C_6H_6$ | $C_6H_{12}$ | CO | $C_6H_6$ | $C_6H_{12}$ | CO | $C_6H_6$ | $C_6H_{12}$ | CO |
| Example 2  TiO2(80) V2O5(3) WO3(8) | 300 | 300 | 700 | 0 | 2.6 | 2.6 | 3080 | 99.1 | 99.6 | — |

Example 2

Exhaust gas 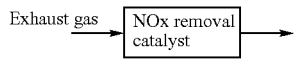

Kerosene combustion exhaust gas:
Linear flow velocity 2.0 Nm/s
$C_6H_6$: 300 ppm
$C_6H_{12}$ (cyclohexane): 700 ppm
$O_2$: 5%,
NOx: 1,500 ppm
$NH_3$: 1,380 ppm
$CO_2$, $H_2O$, $N_2$: Not controlled.
Space velocity of NOx removal catalyst [GHSV]: 2,800h$^{-1}$
Operation temperature 300° C.

TABLE 3

| | CO/VOC removal catalyst | Temperature (° C.) | Degree of conversion (%) | | | | |
|---|---|---|---|---|---|---|---|
| | | | CO | $CH_4$ | $C_2H_6$ | $C_3H_8$ | $C_4H_{10}$ |
| Comparative Example 1 | Commercially available catalyst | 400 | 99.9 | — | — | 10 | — |

Comparative Example 1

Kerosene combustion exhaust gas:
Linear flow velocity 2.5 Nm/s
CO: 63 ppm
$C_3H_8$: 13 ppm
$C_2H_4$: 13 ppm
NOx: 63 ppm
$O_2$: 15%,
$CO_2$, $H_2O$, $N_2$: Not controlled.
Space velocity of CO/VOC removal catalyst [GHSV]: 59,000h$^{-1}$
Operation temperature 400° C.

Conditions for Evaluating the Degree of Conversion:

Tests for evaluating the degree of conversion using the catalysts prepared according to Examples 3 to 6 and Comparative Examples 2 and 3 were performed under the following conditions. The tests were performed by cutting specimens from the catalysts. The results are shown in Table 4. In the Examples according to the present invention, the degree of conversion of saturated hydrocarbons increased from 16% to 28%.

TABLE 4

| | Substrate | NOx removal-accelerating component in substrate (wt %) | Carrier (porous inorganic oxide) | BET specific surface area ($m^2$/g) | Amount of applied carrier ($m^2$/g) | Thickness of layer coated with either carrier or carrier and NOx removal-accelerating component (μm) | Active component | | |
|---|---|---|---|---|---|---|---|---|---|
| | | | | | | | Species | Amount (g/L) | Size (nm) |
| Example 3 | $TiO_2$-based solid honey comb | $V_2O_5$(3) $WO_3$(8) | $\gamma$-$Al_2O_3$ | 113 | 8.5~11.5 | 4~20 | Pt | 0.39~0.53 | 11 |
| Example 4 | $TiO_2$-based solid honey comb | $WO_3$(20) | $\gamma$-$Al_2O_3$ | 113 | 8.5~11.5 | 4~20 | Pt | 0.39~0.53 | 11 |
| Example 5 | $TiO_2$-based solid honey comb | $V_2O_5$(3) $WO_3$(8) | $\gamma$-$Al_2O_3$ | 113 | 11.9~16.1 | 6~30 | Pt | 0.39~0.53 | 11 |
| Example 6 | $TiO_2$-based solid honey comb | $WO_3$(20) | $\gamma$-$Al_2O_3$ | 113 | 11.9~16.1 | 6~30 | Pt | 0.39~0.53 | 11 |
| Comparative Example 2 | Cordierite honey comb | — | $\gamma$-$Al_2O_3$ | 113 | 42.5~57.5 | 30~80 | Pt | 0.43~0.58 | 11 |
| Comparative Example 3 | Cordierite honey comb | — | $\gamma$-$Al_2O_3$ | 113 | 42.5~57.5 | 30~80 | Pt | 0.43~0.58 | 11 |

| | NOx removal-accelerating component in coating material (wt %) | Order of production steps | | | | Degree of conversion of each gas at 400° C. (%) | | |
|---|---|---|---|---|---|---|---|---|
| | | Pt loading (spray drying) | Mixing carrier and partial oxidation-accelerating component | Wash-coating | Pt loading (impregnation) | CO | $C_2H_4$ | $C_3H_8$ |
| Example 3 | — | 1 | 2 | 3 | | 99.9 | 98.9 | 28.4 |
| Example 4 | — | 1 | 2 | 3 | | 99.9 | 98.9 | 28.4 |
| Example 5 | $V_2O_5$(0.9) $WO_3$(2.4) | 1 | 2 | 3 | | 99.9 | 99.2 | 28.4 |

TABLE 4-continued

| | | | | | | | | |
|---|---|---|---|---|---|---|---|---|
| Example 6 | WO₃(6) | 1 | 2 | 3 | | 99.9 | 99.1 | 28.2 |
| Comparative Example 2 | — | | | 1 | 2 | 100 | 99 | 16.1 |
| Comparative Example 3 | — | 1 | | 2 | | 98 | 70 | 4 |

Kerosene Combustion Exhaust Gas
CO: 63 ppm
$C_2H_4$: 13 ppm
$C_3H_8$: 13 ppm
NOx: 63 ppm
$O_2$: 15%,
$CO_2$, $H_2O$, $N_2$: Not controlled.
GHSV: 59,000 $h^{-1}$
Linear flow velocity 2.5 Nm/s
Catalyst layer temperature 400° C.

The degree of gas conversion is represented by the following expressions.

Degree of CO conversion (%)=(1−outlet CO concentration/inlet CO concentration)×100

Degree of $C_2H_4$ conversion (%)=(1−outlet $C_2H_4$ concentration/inlet $C_2H_4$ concentration)×100

Degree of $C_3H_8$ conversion (%)=(1−outlet $C_3H_8$ concentration/inlet $C_3H_8$ concentration)×100

The catalyst for treating exhaust gas according to the present invention and a catalyst for treating exhaust gas obtained by the method for producing the above-described catalyst can be used for treating exhaust gases discharged from various industrial equipment such as automobile engines, gas engines, gas turbines for aircraft and for power generation, and equipment in chemical plants and in various factories.

While the present invention has been described in terms of the preferred embodiments, those skilled in the art will recognize that the present invention can be practiced with modification within the spirit and scope of the appended claims.

The disclosure of Japanese Patent Application No. 2006-039356 filed on Feb. 16, 2006 including the specification, the claims, and the abstract is incorporated herein by reference with its entirety.

What is claimed is:

1. A method for producing a catalyst for treating an exhaust gas containing carbon monoxide and volatile organic compounds, wherein the catalyst comprises a substrate containing a NOx removal catalyst component and a porous inorganic compound layer containing a noble metal and a NOx removal catalyst, the layer being applied to the substrate;

the method comprising the steps of:
reducing an aqueous metal salt solution in which one or more metal salts are dissolved to prepare a metal colloidal solution;
loading the metal colloidal solution on an active porous inorganic compound to form a first slurry;
mixing the first slurry with a second slurry containing a NOx removal catalyst; and
applying the mixture to a substrate containing a fresh NOx removal catalyst which has not been used for the removal of NOx from exhaust gas.

* * * * *